(12) United States Patent
Arnault

(10) Patent No.: US 7,228,951 B2
(45) Date of Patent: Jun. 12, 2007

(54) CLUTCH RELEASE BEARING AND METHOD OF ASSEMBLY

(75) Inventor: Benoît Arnault, Saint Cyr Sur Loire (FR)

(73) Assignee: Aktiebolaget SKF, Gothenburg (SE)

( * ) Notice: Subject to any disclaimer, the term of this patent is extended or adjusted under 35 U.S.C. 154(b) by 71 days.

(21) Appl. No.: 10/870,484

(22) Filed: Jun. 17, 2004

(65) Prior Publication Data
US 2005/0011718 A1    Jan. 20, 2005

(30) Foreign Application Priority Data
Jun. 18, 2003  (FR) ................... 03 07355

(51) Int. Cl.
*F16D 23/14*  (2006.01)

(52) U.S. Cl. ............ 192/98; 192/110 B; 29/450; 384/517; 384/903

(58) Field of Classification Search ............ 384/903
See application file for complete search history.

(56) References Cited

U.S. PATENT DOCUMENTS

| 4,029,186 A | * | 6/1977 | De Gennes ............ 192/98 |
| 4,046,238 A |   | 9/1977 | Mendoza-Orozco |
| 4,319,220 A |   | 3/1982 | Pappas et al. |
| 4,478,595 A |   | 10/1984 | Hayakawa et al. |
| 4,601,374 A |   | 7/1986 | Ladin |
| 4,608,741 A | * | 9/1986 | Mallet ............ 384/617 |
| 4,641,523 A |   | 2/1987 | Andreasson |
| 4,699,530 A |   | 10/1987 | Satoh et al. |
| 4,815,867 A | * | 3/1989 | Ladin ............ 192/98 |
| 4,854,436 A | * | 8/1989 | Lassiaz et al. ............ 192/98 |
| 4,872,768 A |   | 10/1989 | Brandenstein et al. |
| 4,874,073 A |   | 10/1989 | Tagawa |
| 4,881,629 A | * | 11/1989 | Gay et al. ............ 192/98 |
| 4,946,295 A |   | 8/1990 | Hajzler |
| 4,957,133 A |   | 9/1990 | Linz et al. |
| 5,008,647 A |   | 4/1991 | Brunt et al. |
| 5,018,384 A |   | 5/1991 | Hayashi et al. |

(Continued)

FOREIGN PATENT DOCUMENTS

DE         10148388        4/2003

(Continued)

OTHER PUBLICATIONS

Preliminary Search Report for FR 0307356 mailed on Nov. 23, 2003 (2 pages).

(Continued)

*Primary Examiner*—Richard M. Lorence
(74) *Attorney, Agent, or Firm*—Meyertons, Hood, Kivlin, Kowert & Goetzel, P.C.; Eric B. Meyertons

(57) ABSTRACT

Clutch release bearing device that includes: an operating element; a rolling-contact bearing fitted with a non-rotating ring and a rotating ring and connected axially to the operating element; and an annular fixing ring provided with an axial portion mounted inside the operating element and also with an axially elastic portion whose axially opposite side from the operating element is pressed axially against the non-rotating ring, the fixing ring being able to keep the non-rotating ring axially connected to the operating element and yet allow radial movement.

16 Claims, 4 Drawing Sheets

U.S. PATENT DOCUMENTS

| | | |
|---|---|---|
| 5,033,013 A | 7/1991 | Kato et al. |
| 5,264,790 A | 11/1993 | Moretti et al. |
| 5,372,435 A | 12/1994 | Genero et al. |
| 5,575,568 A | 11/1996 | Rigaux et al. |
| 5,592,401 A | 1/1997 | Kramer |
| 5,598,913 A | 2/1997 | Monahan et al. |
| 5,713,577 A | 2/1998 | Lannert et al. |
| 5,721,539 A | 2/1998 | Goetzl |
| 5,780,731 A | 7/1998 | Matsui et al. |
| 5,845,230 A | 12/1998 | Lamberson |
| 5,865,288 A | 2/1999 | Thomire et al. |
| 5,877,431 A | 3/1999 | Hirano |
| 6,011,491 A | 1/2000 | Goetzl |
| 6,013,007 A | 1/2000 | Root et al. |
| 6,035,990 A | 3/2000 | Peschke |
| 6,043,643 A | 3/2000 | Message et al. |
| 6,056,446 A | 5/2000 | Welter et al. |
| 6,109,624 A | 8/2000 | Message et al. |
| 6,160,480 A | 12/2000 | Su-yueh |
| 6,196,552 B1 | 3/2001 | Peterson et al. |
| 6,267,512 B1 | 7/2001 | Beghini et al. |
| 6,323,640 B1 | 11/2001 | Forestiero et al. |
| 6,338,576 B1 | 1/2002 | Girardin et al. |
| 6,415,900 B1 | 7/2002 | Lopez et al. |
| 6,539,336 B1 | 3/2003 | Vock et al. |
| 6,611,138 B2 | 8/2003 | Vasiloiu |
| 6,612,749 B2 | 9/2003 | Arnault et al. |
| 6,666,784 B1 | 12/2003 | Iwamoto et al. |
| 6,746,352 B1 | 6/2004 | Poiret et al. |
| 6,908,229 B2 | 6/2005 | Landrieve et al. |
| 2003/0002764 A1 | 1/2003 | Pflugner et al. |
| 2004/0154895 A1 | 8/2004 | Thomire et al. |

FOREIGN PATENT DOCUMENTS

| | | |
|---|---|---|
| EP | 0399855 | 11/1990 |
| EP | 806581 A1 * | 11/1997 |
| EP | 1146244 | 10/2001 |
| FR | 2577291 | 8/1986 |
| FR | 2611244 | 8/1988 |
| FR | 2772444 | 6/1999 |
| FR | 2819864 | 7/2002 |
| GB | 1580301 | 12/1980 |
| GB | 2054084 | 2/1981 |
| JP | 6213251 | 8/1994 |
| WO | 0142809 | 5/2001 |
| WO | 02052163 | 7/2002 |
| WO | 02052280 | 7/2002 |
| WO | 04005937 | 1/2004 |

OTHER PUBLICATIONS

Preliminary Search Report for FR 0307355 mailed on Nov. 24, 2003 (2 pages).

Preliminary Search Report for FR 0311989 mailed on Feb. 24, 2004 (2 pages).

U.S. Appl. No 10/870,483 entitled "Clutch Release Bearing" filed on Jun. 17, 2004 (21 pages, including cover sheet and drawings).

U.S. Appl. No. 10/956,679 entitled "Clutch Release Bearing Device" filed on Oct. 14, 2004 (19 pages including cover sheet and drawings).

* cited by examiner

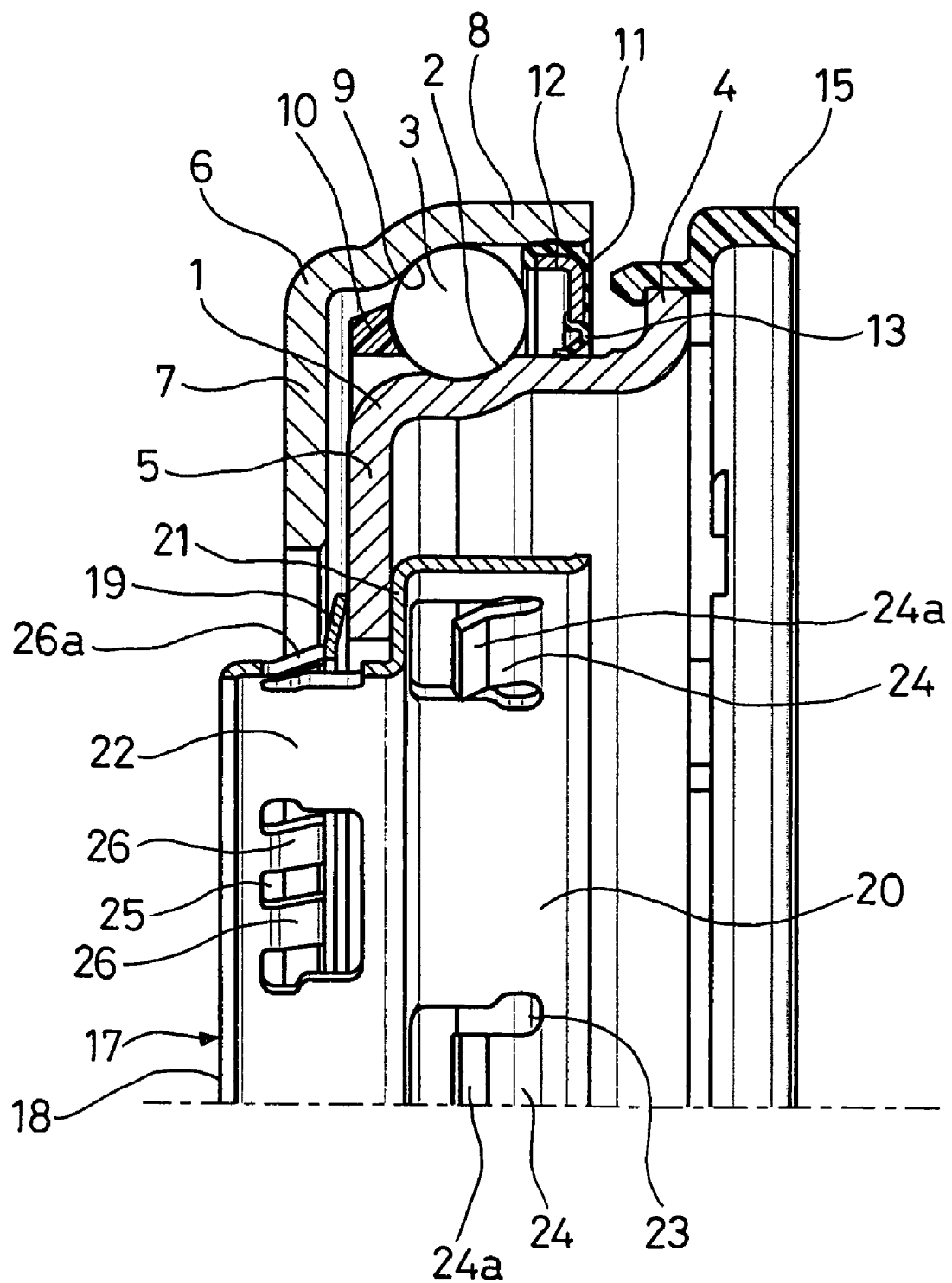
FIG_1

FIG_2
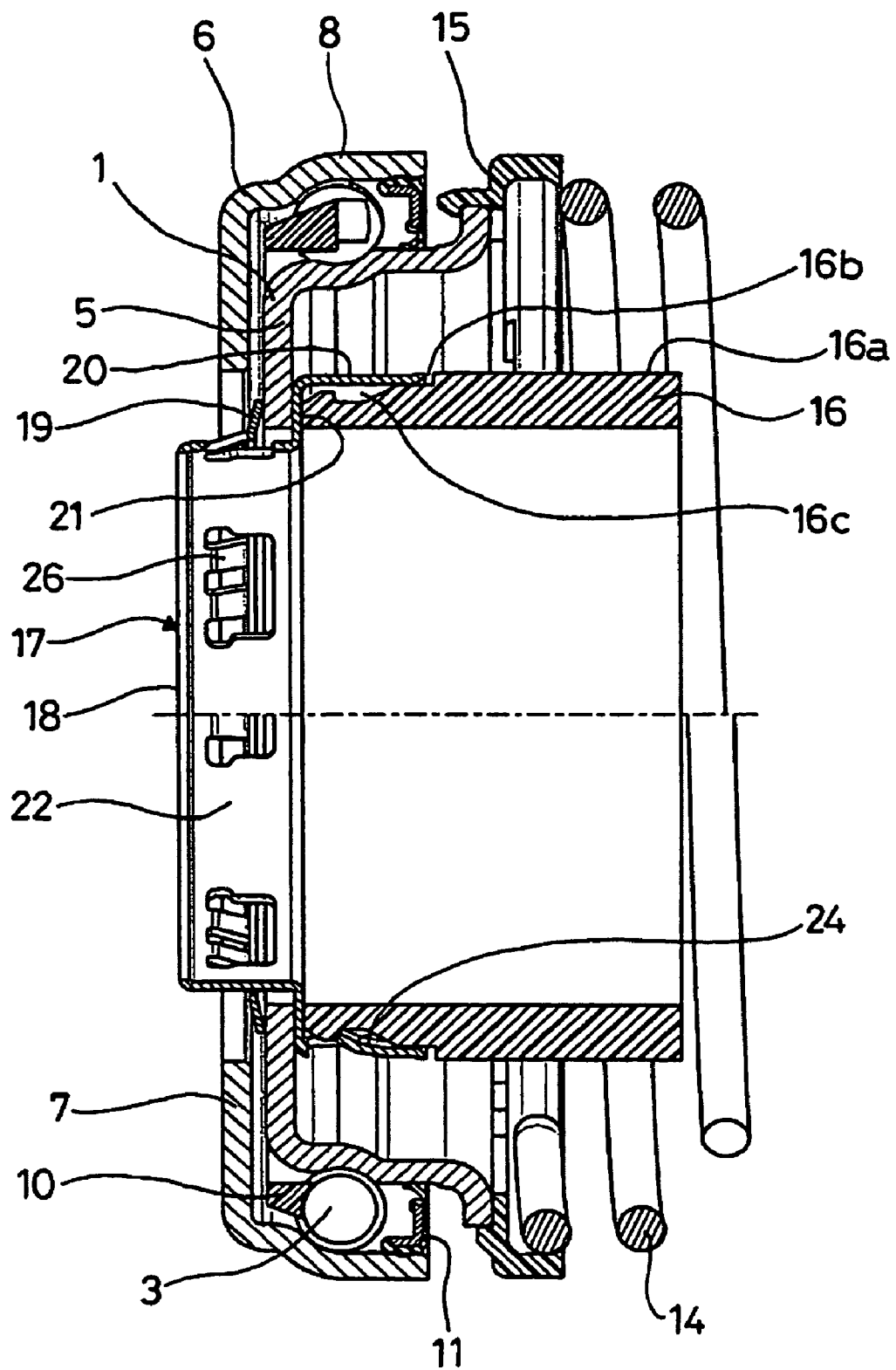

FIG_3
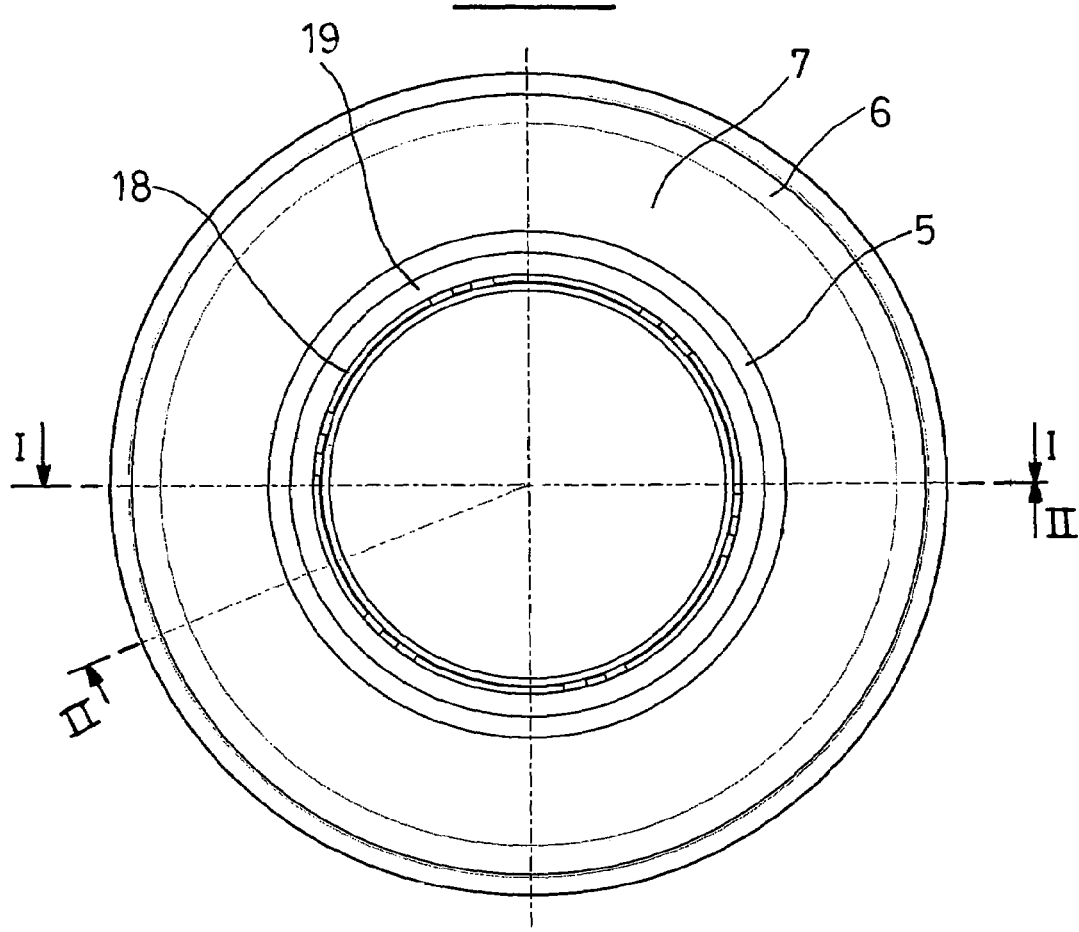
FIG_4
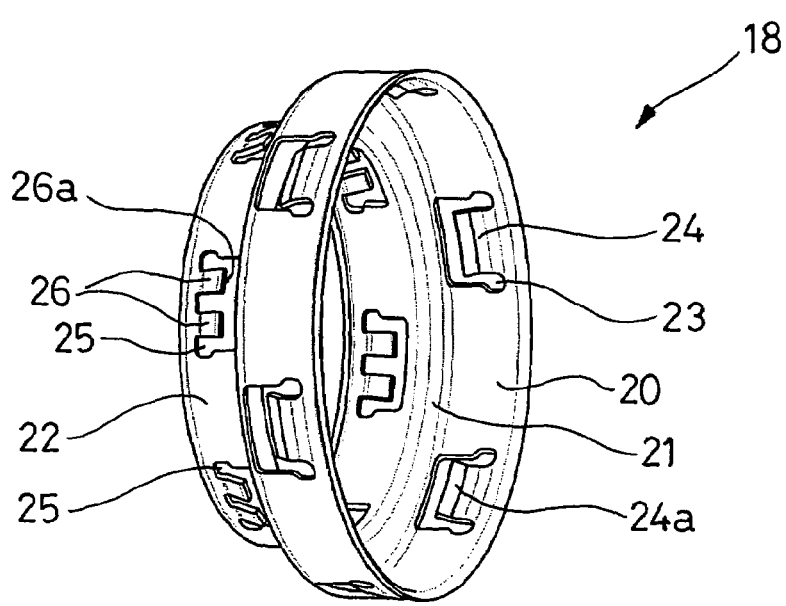

FIG_5
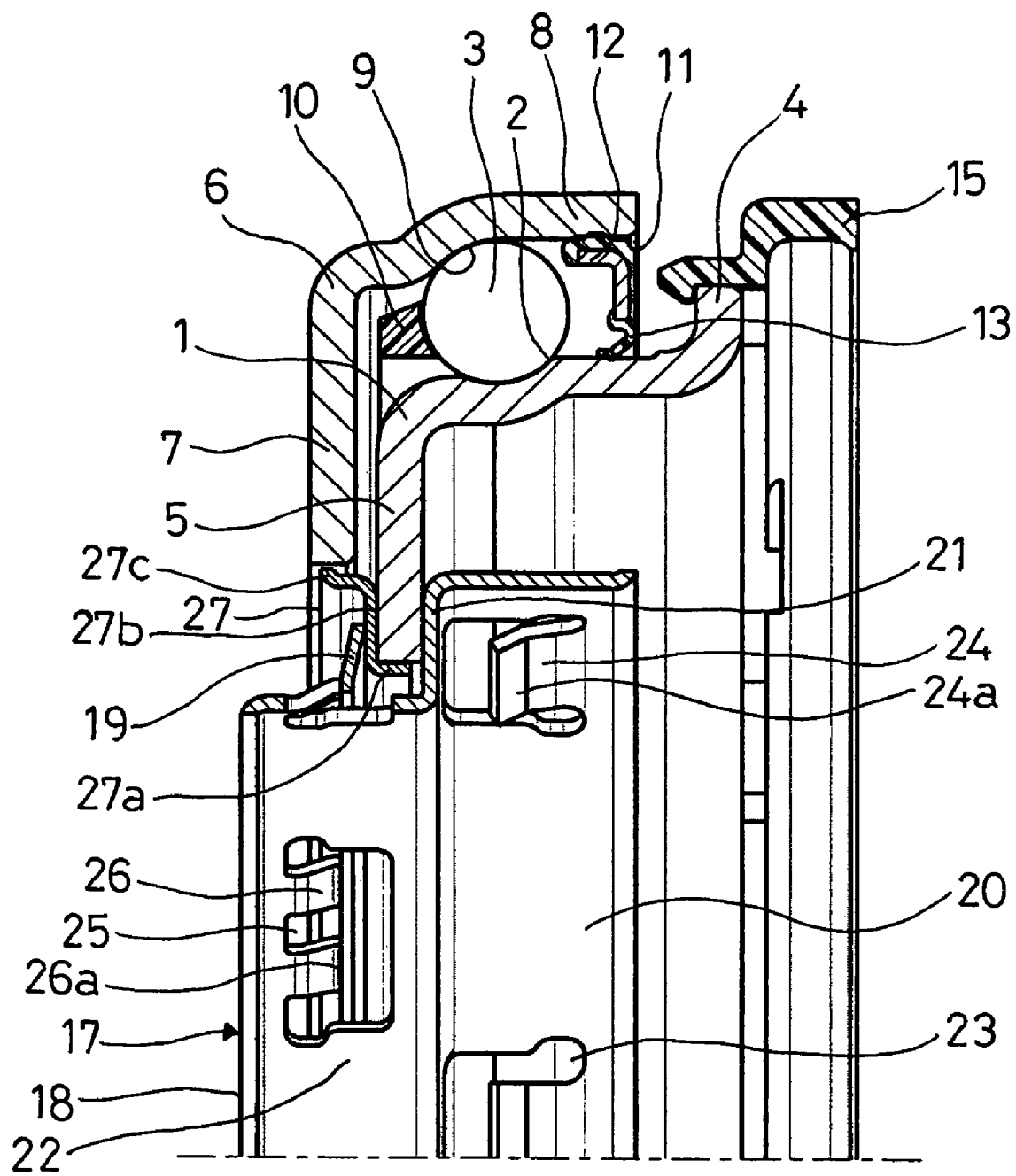

CLUTCH RELEASE BEARING AND METHOD OF ASSEMBLY

BACKGROUND OF THE INVENTION

1. Field of the Invention

The present invention generally relates to clutch release bearings designed to act on the diaphragm spring of a clutch, particularly for a motor vehicle.

2. Description of the Relevant Art

Clutch release bearings include a rolling-contact bearing in which one of the rings rotates and the other does not rotate. Between the rotating ring and the non rotating ring are a series of balls distributed regularly in the circumferential direction by means of a cage. The rotating ring has an essentially radial leading surface which is designed to come into contact with the ends of the fingers of the clutch diaphragm spring. An operating element supports the rolling-contact bearing and, under the action of a control member (which may be mechanical, electrical or hydraulic), moves the rolling-contract thrust bearing axially against the clutch diaphragm spring.

Document WO 02/052163 discloses a motor vehicle clutch bearing equipped with an axially moving piston and a ring attached to the piston by axially acting elastic clamping means. One face of the ring bears on an attachment face formed in the piston. The clamping means bear on the opposite face of the ring and another attachment face, also formed in the piston. The elastic clamping means take the form of an annular attachment with teeth projecting into axial drillings formed in the piston and leading to radial drillings.

SUMMARY

The embodiments presented herein may provide a sturdy and reliable clutch release bearing with components of relatively simple shape. In an embodiment, the clutch release bearing device may include: an operating element; a rolling-contact bearing fitted with a non-rotating ring and a rotating ring; and a means of axial connection between the operating element and the rolling-contact bearing. The device may include a fixing ring mounted on the operating element. The fixing ring may include a plurality of radially elastic tabs for the axial retention of an elastic element that may be placed axially between the elastic tabs and the non-rotating ring in order to apply axial pressure on the non-rotating ring. Such a device may be capable of acting on a clutch mechanism diaphragm spring.

Assembling the bearing is a simple and practical task. The elastic element may be fitted after assembling the rolling-contact bearing and the fixing ring by snap-fastening it into position with an axial movement. The operating element is simple in shape and is therefore sturdy. Advantageously, the fixing ring may be made in one piece, making it sturdy and economical.

In one embodiment, the fixing ring may include tabs for fixing it to the operating element. The fixing ring may be fixed to the operating element by a simple axial movement, the fixing tabs having a certain radial elasticity. The operating element may possess at least one stop surface in contact with the fixing tabs. The stop surface may be radial and in contact with the free extremities of the fixing tabs.

In one embodiment, the fixing ring may include a first axial portion in contact with the operating element, a radial portion, and a second axial portion supporting the elastic tabs. The fixing tabs may extend from the first axial portion.

In one embodiment, the radial portion may be in contact with the non-rotating ring and with the operating element. The non-rotating ring may move radially relative to the radial portion. In some embodiments, it may be preferable that the sheet-metal non-rotating ring be in contact with the radial portion of the fixing ring, which is also made of sheet metal. In such embodiments, premature wear may be substantially avoided.

In one embodiment, the second axial portion may pass through the area of least diameter of the non-rotating ring. The smallest diameter of the non-rotating ring may be slightly greater, for example by a few tenths of a millimeter or a few millimeters, than the outside diameter of the second axial portion. The non-rotating ring may include an inwardly directed radial arm for attachment to the operating element.

In one embodiment, the elastic tabs may extend from the second axial portion and may be directed obliquely outward from the second axial portion towards the radial portion of the fixing ring. The elastic tabs may be formed by cutting windows into the second axial portion and bending tabs out, the tabs being integral with the second axial portion and supported by an annular end portion remote from the radial portion. In a further embodiment, the tabs may be formed by bending discontinuous portions that extend beyond the annular portion.

In one embodiment, the elastic element may include an axially elastic washer, such as a Belleville washer.

In one embodiment, the elastic tabs may be in contact with a small-diameter portion of the elastic element. The large-diameter portion of the elastic element may be in contact with the opposite side of the non-rotating ring from the operating element. The non-rotating ring is therefore held elastically between the radial portion of the fixing ring and the elastic element. The elastic tabs may form a strong axial abutment for the small-diameter area of the elastic element. The elastic tabs may have free extremities whose diameter is greater than the bore of the elastic element in the free state. The elastic element may have a bore greater than the outside diameter of the second axial portion.

The non-rotating ring may include an inwardly directed radial portion situated axially between a radial portion of the fixing ring and the said elastic element. In one embodiment, the non-rotating ring may be in direct contact with the elastic element.

In one embodiment, a sealing element may be attached to the non-rotating ring and in contact with the elastic element. The sealing element may form a narrow passage with the rotating ring. The sealing element may be in the form of an annular sheet-metal dish.

In another embodiment, the operating element is an axially acting hydraulic push member.

Some embodiments may also provide a clutch control system equipped with a clutch release bearing device of the type including: an operating element; a rolling-contact bearing fitted with a non-rotating ring and a rotating ring in contact with a diaphragm spring, and a means of axial connection between the operating element and the rolling-contact bearing. The device may include a fixing ring mounted on the operating element. The fixing ring may include a plurality of radially elastic tabs for the axial retention of an elastic element placed between the elastic tabs and the non-rotating ring in order to apply axial pressure on the non-rotating ring.

Certain embodiments may also provide a method for assembling a clutch release bearing, in which an elastic element may be brought into contact with a non-rotating ring of a rolling-contact bearing; and a fixing ring consisting of a plurality of radially elastic tabs may be advanced from the axially opposite side of the non-rotating ring in such a way that the elastic tabs retract radially as they pass through the elastic element, after which they resume their initial shape, preventing separation of the non-rotating ring and the elastic element and allowing the elastic element placed between the elastic tabs and the non-rotating ring to apply axial pressure to the non-rotating ring.

In one embodiment of the invention, the fixing ring is fitted onto an operating element.

In one embodiment of the invention, axial pressure is applied to the elastic element to help the elastic tabs click into place.

The fixing ring is economical to produce, easy to install by a simple axial movement, and compact.

BRIEF DESCRIPTION OF THE DRAWINGS

Other objects and advantages of the invention will become apparent to those skilled in the art upon reading the following detailed description and upon reference to the accompanying drawings in which:

FIG. 1 is a half-view in axial section of a clutch release bearing.

FIG. 2 is a view in axial section of a clutch release bearing and the operating element supporting it.

FIG. 3 is an end elevation of the bearing illustrated in FIG. 2.

FIG. 4 is a perspective view of the fixing ring of the clutch release bearing of FIG. 1.

FIG. 5 is a half-view in axial section of a clutch release bearing.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As can be seen in FIG. 1, the clutch release bearing comprises a thin-walled non-rotating rolling-contact bearing ring 1 pressed from sheet metal or tube and having a circular race 2, in the form of a portion of a torus for a row of rolling elements 3, which are depicted here as balls, the said race having a meridian axial section shaped as a concave arc of a circle. The inner ring 1 may include an outwardly directed radial portion 4 and an inwardly directed radial portion 5, the radial portions 4 and 5 being situated one on either side of the rolling elements 3. The non-rotating ring 1 is an inner ring. In alternate embodiments, non-rotating ring 1 may be an outer ring.

The rolling-contact bearing is completed by an outer ring 6, which has a radial portion 7 projecting towards the centre of the hole and a cylindrical portion 8, oriented towards radial portion 4. The radial portion 7 is capable of coming into contact with the surface of a diaphragm spring or equivalent element (not shown), making it possible to actuate a clutch, such as may be found in a motor vehicle. The outer ring 6 may also include a thin wall which may be stamped from sheet metal or tube. The outer ring 6 may have a circular race 9 in the form of a portion of a torus for the row of rolling elements 3, the race having in meridian axial section, a profile of a concave arc of a circle. The rolling elements 3 may be held in position by a cage 10, between race 2 of inner ring 1 and race 9 of outer ring 6. The ball bearing is completed by a leak-resistant seal 11, mounted in the cylindrical portion 8 of outer ring 5. Seal 11 may further include reinforcement 12 and flexible part 13 that rubs on a cylindrical bearing surface of non-rotating ring 1.

There may also be a spring 14, shown in FIG. 2, for preloading the bearing, and an attachment element 15. Spring 14 is of helical type, its diameter being about the same as the outside diameter of radial portion 4 of non-rotating ring 1. Attachment element 15 snaps onto the rim of radial portion 4 and provides an interface between spring 14 and non-rotating ring 1. In the case of a hydraulic bearing, spring 14 keeps the bearing pressed against the diaphragm spring with a certain axial preload when the clutch is not being operated, such as may occur, for example, when there is no hydraulic pressure in the clutch actuating system.

The clutch bearing is completed by an operating element 16, visible in FIG. 2. Operating element 16 may be a separate part from the control member actuating the device or be an integral part of it. Operating element 16 may consist, for example, of the hydraulic piston of a hydraulically controlled clutch release bearing device.

The clutch release bearing may also include axial connector 17 between operating element 16 and the rolling-contact thrust bearing or, more precisely, non-rotating ring 1. Axial connector 17 may be of the type that permits a certain radial displacement of non-rotating ring 1 of the rolling-contact thrust bearing relative to operating element 16.

More precisely, operating element 16 may take the form of a portion of tube made of synthetic material and having a cylindrical bore and an outer surface 16a, which may also be cylindrical, the hole being surrounded at a certain distance by spring 14. However, the end of operating element 16 oriented towards axial connector 17 may have a slightly reduced outer diameter with a shoulder 16b and an annular groove 16c. The outwardly open annular groove 16c may include an approximately radial lip opposite shoulder 16b.

Axial connector 17 may include a fixing ring 18 and, separate from this, an elastic washer 19. Elastic washer 19 may be, for example, a Belleville washer with an outer edge in contact with the opposite side of radial portion 5 of non-rotating ring 1 of operating element 16 and an inner edge that is axially offset relative to radial portion 5.

Fixing ring 18 may take the form of a one-piece component made of sheet metal and of generally annular shape. Fixing ring 18 may include a first axial portion 20, a radial portion 21 and, connected to the first axial portion 20 by radial portion 21, a second axial portion 22. Radial portion 21 is in contact with the opposite side of radial portion 5 of inner ring 1 of elastic washer 19. First axial portion 20 may extend axially away from radial portion 5 and level with rolling elements 3 and leak-resistant seal 11, and remain short of radial portion 4. First axial portion 20 may have a diameter greater than the smallest diameter of non-rotating ring 1 at the free extremity of radial portion 5.

A plurality of U-shaped windows 23 may be cut out from first axial portion 20, leaving behind tabs 24 that have a certain radial elasticity and are attached to first axial portion 20, towards its free extremity, that is away from the radial portion 21. Tabs 24 may include free extremity 24a that is bent inwards at an oblique angle.

As is shown more particularly in FIG. 2, first axial portion 20 is mounted around the reduced-diameter free extremity of operating element 16. Radial portion 21 comes into contact with the radial end surface on the end of operating element 16. Radial portion 21 thus transmits axial loads between operating element 16 and non-rotating ring 1 of the rolling-contact bearing. The free extremity of first axial portion 20 is situated at a slight distance from shoulder 16b. Tabs 24 project into annular groove 16c with their free extremities 24a coming into axial contact with the opposite radial surface of annular groove 16c from shoulder 16b. Fixing ring 18 and operating element 16 may have essentially identical outside diameters. Fixing ring 18 and operating element 16 may be coupled to each other by a simple axial movement. Free extremities 24a of tabs 24 are configured to retreat outwards before dropping into annular groove 16c, where they may at least partially resume their original position in the free state, thus making it certain that fixing ring 18 cannot come off operating element 16.

The outside diameter of second axial portion 22 is smaller than the smallest diameter of non-rotating ring 1 measured at the free extremity of radial portion 5. The difference between these diameters may allow for a certain radial displacement of the rolling-contact thrust bearing relative to operating element 16, and may therefore allow self-alignment of the rolling-contact thrust bearing relative to the clutch diaphragm spring.

Second axial portion 22 projects axially past radial portion 5 of non-rotating ring 1. Cut-outs 25 may be formed in second axial portion 22. In some embodiments, cut-outs 25 may be generally W-shaped, leaving behind two tabs 26 in each cut-out 25. Tabs 26 are attached to the opposite side of second axial portion 22 from radial portion 21 and have a free extremity that projects outward radially. In other words, of the second axial portion 22, cut-outs 25 leave behind two continuous annular portions, one adjacent to radial portion 21 and the second remote from the latter, plus a central portion in which cut-outs 25 are formed. The free extremities of tabs 26 are in contact with the inner edge of elastic washer 19.

The parts may be assembled in the following manner: Fixing ring 18 may be inserted into non-rotating ring 1, axially from the open end, that is from the end with turned-out radial portion 4. The second axial portion 22 of fixing ring 18 may be inserted through the free extremity of radial portion 5 of non-rotating ring 1. Depending on their outward inclination, tabs 26 may or may not be made to contact and therefore retract as they pass radial portion 5. Next, elastic washer 19 may be fitted on over the free extremity of second axial portion 22, and elastic washer 19 is forced axially against radial portion 5 of non-rotating ring 1, so that tabs 26 retract radially as the bore of elastic washer 19 passes over them, before they resume their initial position and snap-fasten on the opposite side of elastic washer 19 from radial portion 5. The applied force is then removed. Extremities 26a of tabs 26 now form an axial retention stop for elastic washer 19, thereby preventing any axial movement of the washer in a direction away from operating element 16. Elastic washer 19 is thus positioned and axially preloaded between elastic tabs 26 and radial portion 5 of non-rotating ring 1.

Since elastic washer 19 has, in the free state, an axial length slightly greater than the axial space between radial portion 5 and the free extremity of tabs 26 when radial portion 21 of fixing ring 18 is in contact with radial portion 5, it may be necessary to use an annular tool to press elastic washer 19 against radial portion 5. This tool (not shown) will have a large enough bore to allow tabs 26 to resume their initial shape. After the tool has been removed, elastic washer 19 tends, by elasticity, to resume its shape in the free state. The inner edge of elastic washer 19 thus comes into contact with the free extremity of tabs 26. The inner edge of elastic washer 19, due to its small diameter, presses on free extremity 26a of elastic tabs 26.

As will readily be recognized by one skilled in the art, this type of fitting is simple, involving a first axial movement to place fixing ring 18 in non-rotating ring 1, and a second axial movement to put elastic washer 19 in position. There is no need for any bending operation during the assembly of these components.

In the embodiment illustrated in FIG. 5, there is in addition an annular seal 27, which may include a first axial portion 27a in contact with the bore of radial portion 5 of non-rotating ring 1. First axial portion 27a may be a firm fit inside the bore of radial portion 5, or simply it may be centered within it. Seal 27 is completed by radial portion 27b, which is in contact, on one side, with radial portion 5 and on the other side with the outer edge of elastic washer 19, followed by a second axial portion 27c directed away from radial portion 5 and forming a narrow passage with the free extremity of radial portion 7 of rotating ring 6, in order to improve the leak-resistance of the rolling-contact bearing. In other words elastic washer 19 is in contact with an element mounted on non-rotating ring 1, and this element prevents leaks between the rotating and non-rotating rings.

The embodiments presented herein provide a compact system for fixing the self-centering rolling-contact thrust bearing that is easy to assembly, even by automatic means. All that is required is to put together the subassembly consisting of the rolling-contact bearing and fixing ring by positioning the rolling-contact bearing on the fixing ring, and then snap-fasten the elastic washer over the fixing ring in a simple axial movement. The resulting subassembly can also be snap-fastened by a simple axial movement onto the push member or operating element that comprises an annular groove to hold the elastic tabs of the first axial portion of the fixing ring. Alternatively, the operating element and the fixing ring can be assembled beforehand.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A clutch release bearing device comprising:
   an operating element;
   a rolling-contact bearing fitted with a non-rotating ring and a rotating ring;
   a means of axial connection between the operating element and the rolling-contact bearing, the means of axial connection comprises a fixing ring mounted on the operating element and provided with a plurality of radially elastic tabs for the axial retention of an elastic element which is placed between the elastic tabs and the non-rotating ring in order to apply axial pressure on the non-rotating ring, wherein the elastic tabs extend obliquely outward from the fixing ring towards the elastic member.

2. The clutch release bearing device of claim 1, wherein the fixing ring is made in one piece.

3. The clutch release bearing device of claim 1, wherein the fixing ring further comprises tabs for coupling the fixing ring to the operating element.

4. The clutch release bearing device of claim 1, wherein the fixing ring comprises a first axial portion is coupled to the operating element, a radial portion, and a second axial portion supporting said elastic tabs.

5. The clutch release bearing device of claim 4, wherein the radial portion is coupled to the non-rotating ring.

6. The clutch release bearing device of claim 4, wherein the second axial portion passes through the area of least diameter of the non-rotating ring.

7. The clutch release bearing device of claim 4, wherein the elastic tabs extend from the second axial portion towards the radial portion of the fixing ring.

8. The clutch release bearing device of claim 1, wherein the elastic element comprises an axially elastic washer.

9. The clutch release bearing device of claim 1, wherein the elastic tabs are coupled to a small-diameter area of said elastic element.

10. The clutch release bearing device of claim 1, wherein the non-rotating ring comprises an inwardly directed radial portion situated axially between a radial portion of the fixing ring and the elastic element.

11. The clutch release bearing device of claim 1, wherein the non-rotating ring is coupled to the elastic element.

12. The clutch release bearing device of claim 1, further comprising a sealing element coupled to the non-rotating ring and to the elastic element.

13. The clutch release bearing device of claim 1, wherein the operating element comprises a hydraulic push member.

14. A clutch release bearing device comprising:

an operating element;

a rolling-contact bearing fitted with a non-rotating ring and a rotating ring;

a fixing ring mounted on the operating element and provided with a plurality of radially elastic tabs for the axial retention of an elastic element which is placed between the elastic tabs and the non-rotating ring in order to apply axial pressure on the non-rotating ring, the elastic tabs being in contact with at least a portion of the elastic element.

15. A method for assembling a clutch release bearing comprising:

coupling an elastic element to a non-rotating ring of a rolling-contact bearing with a fixing ring; wherein the fixing ring comprises a plurality of radially elastic tabs, wherein the elastic tabs prevent separation of the non-rotating ring and the elastic element and wherein the elastic tabs allow the elastic element placed between the elastic tabs and the non-rotating ring to apply axial pressure to the non-rotating ring, and wherein the elastic tabs extend obliquely outward from the fixing ring toward the elastic member; and coupling the fixing ring to an operating element.

16. The method of claim 15, further comprising applying axial pressure to the elastic element to help the elastic tabs click into place.

* * * * *

UNITED STATES PATENT AND TRADEMARK OFFICE
CERTIFICATE OF CORRECTION

| | |
|---|---|
| PATENT NO. | : 7,228,951 B2 |
| APPLICATION NO. | : 10/870484 |
| DATED | : June 12, 2007 |
| INVENTOR(S) | : Arnault |

Page 1 of 1

It is certified that error appears in the above-identified patent and that said Letters Patent is hereby corrected as shown below:

In the Claims:

Claim 4, col. 7, line 11, please delete "portion is coupled" and substitute therefor --"portion coupled"--.

Signed and Sealed this

Fourth Day of September, 2007

JON W. DUDAS
*Director of the United States Patent and Trademark Office*